United States Patent [19]

Nishino et al.

[11] Patent Number: 4,948,867

[45] Date of Patent: Aug. 14, 1990

[54] INTERFACIAL METHOD OF PRODUCING PREPOLYMER OF AROMATIC POLYTHIAZOLE

[75] Inventors: Hideo Nishino, Miyoshi; Tatsuya Hattori, Wako; Tsuneharu Kushida; Masataka Kumata, both of Tokyo, all of Japan

[73] Assignee: Honda Giken Koygo Kabushiki Kaisha, Tokyo, Japan

[21] Appl. No.: 361,370

[22] Filed: Jun. 2, 1989

[30] Foreign Application Priority Data

Jun. 3, 1988 [JP] Japan .................................. 63-136733

[51] Int. Cl.⁵ ............................................. C08G 75/32
[52] U.S. Cl. ..................................... 528/337; 528/336
[58] Field of Search ................................ 528/337, 336

[56] References Cited

U.S. PATENT DOCUMENTS 4,606,875 8/1986 Chenevey et al. .................. 528/337
4,622,285 11/1986 Ahne .................................... 430/322

Primary Examiner—Harold D. Anderson

Attorney, Agent, or Firm—Birch, Stewart, Kolasch & Birch

[57] ABSTRACT

A method of producing a prepolymer of aromatic polythiazole from an aromatic diaminodithiol compound or a salt thereof and a dicarboxylic acid derivative, the prepolymer having a repeating unit represented by the following general formula:

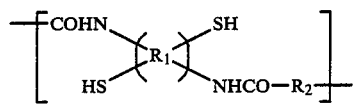

wherein $R_1$ is an aromatic group having at least one benzene nucleus, and $R_2$ is a residual group of the dicarboxylic acid derivative, comprising the step of polymerizing the aromatic diaminodithiol compound or a salt thereof and the dicarboxylic acid derivative by an interfacial polymerization method.

2 Claims, 1 Drawing Sheet

METHOD OF PRODUCING PREPOLYMER OF AROMATIC POLYTHIAZOLE

BACKGROUND OF THE INVENTION

The present invention relates to a method of stably producing prepolymers of aromatic polythiazoles which can be converted by heating to rigid, high-strength aromatic polymers having excellent heat resistance, mechanical properties, chemical resistance, electric properties, etc.

Conventionally, aromatic polythiazole has been produced from an aromatic dimercaptodiamine compound and a dicarboxylic acid derivative, particularly a chloride thereof. Because of its excellent mechanical strength, the aromatic polythiazole is expected to be used as a plastic material substituting for metal materials, alone or in combination with other engineering plastics.

In these circumstances, attempts have been proposed to provide polymer blend-type composite materials having so-called interstitial structure (molecular composite materials) by dispersing so-called rigid, high-strength aromatic polymers such as aromatic polythiazole in soft matrix polymers finely to the extent of molecular level. Since the unidirectional orientation of the molecular chains of rigid, high-strength polymers for increasing their strength is not performed in such molecular composite materials, the molecular composite materials show little anisotropy and excellent mechanical strength, heat resistance, solvent resistance, etc.

However, since the rigid, high-strength aromatic polymers such as aromatic polythiazole have extremely low dispersibility in matrixes of other polymers, it is as a practical matter difficult to produce the above molecular composite materials. In this circumstance, the present inventors previously noticed that prepolymers of rigid, high-strength aromatic polymers such as aromatic polythiazole are soluble in organic solvents together with matrix polymers such as nylons or their prepolymers, and found that by first blending the prepolymers of rigid, high-strength aromatic polymers with matrix polymers or their prepolymers in organic solvents and then heating the resulting blends to cause a ring closure reaction of the prepolymers of rigid, high-strength aromatic polymers, molecular composite materials containing uniformly dispersed rigid, high-strength aromatic polymers can be obtained. Based on this finding, the inventors previously filed patent applications for methods of producing such molecular composite materials in Japan (Japanese Patent Application Nos. 62-158631, 62-158632 and 62-172563).

In the meantime, the prepolymers of aromatic polythiazole have generally been produced by heating mixtures of aromatic diaminodithiol compounds or their salts and dicarboxylic acids or their derivatives in the presence of polyphosphoric acids, etc. However, it is difficult to control the polymerization reaction by heating in the presence of polyphosphoric acids. Thus, the polymerization reaction often proceeds to form polythiazoles. Therefore, various attempts have been made to provide the prepolymer of aromatic polythiazole.

Japanese Patent Laid-Open No. 60-223824 discloses a method of producing polythiazole prepolymers by reacting aromatic and/or heterocyclic diaminodithiol compounds with dicarboxylic acids in the presence of carbodiimide.

However, since the above reaction is carried out in the presence of carbodiimide, the actually formed polythiazole prepolymers are those having low molecular weights, suitable for photoresists, despite the description that the reaction proceeds at such a temperature that the prepolymers are not converted to inactive ring-closed products. The above low-molecular weight prepolymers are not suitable as prepolymers of high-strength polymers which are to be used in molecular composite materials.

OBJECT AND SUMMARY OF THE INVENTION

Accordingly, an object of the present invention is to provide a method of stably and efficiently producing a prepolymer of aromatic polythiazole which can be converted by heating to a rigid, high-strength aromatic polymer having excellent thermal stability, mechanical strength and chemical resistance by intramolecular ring closure.

As a result of intense research in view of the above object, the present inventors have found that a prepolymer of aromatic polythiazole can be stably formed by polymerizing an aromatic diaminodithiol compound or a salt thereof and a dicarboxylic acid derivative by interfacial polymerization. The present invention is based on the above finding.

Thus, the method of producing a prepolymer of aromatic polythiazole according to the present invention comprises the step of polymerizing the aromatic diaminodithiol compound or a salt thereof and the dicarboxylic acid derivative by an interfacial polymerization method to form the prepolymer of aromatic polythiazole having a repeating unit represented by the following general formula:

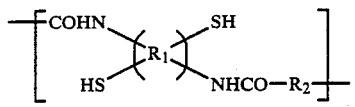

wherein $R_1$ is an aromatic group having at least one benzene nucleus, and $R_2$ is a residual group of the dicarboxylic acid derivative.

DETAILED DESCRIPTION OF THE INVENTION

Figure 1:
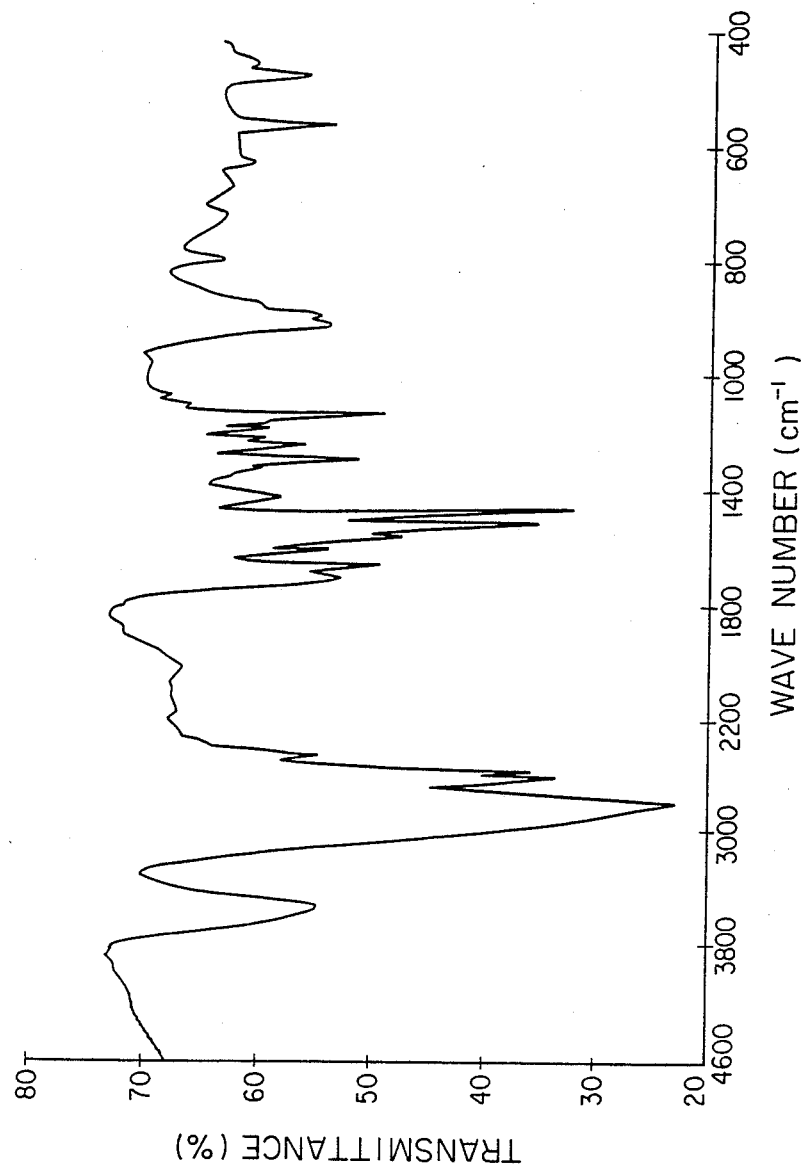
FIG. 1 is a chart showing the result of infrared spectrum analysis of the product in Example 1.

The present invention will be explained in detail below.

The aromatic diaminodithiol compound used in the present invention is a compound having amino groups and thiol groups on both sides of its aromatic residual group, and the aromatic residual group may be not only a benzene ring but also any aromatic ring in which 2 or more benzene rings are condensed. Further, the aromatic residual group may be those having 2 or more benzene rings bonded to each other, such as biphenyl. The amino groups and the thiol groups on both sides may be bonded to the aromatic residual group $R_1$ symmetrically with respect to its axis or its central point. Further, to increase the reactivity of the aromatic diaminodithiol compound, the amino groups may be in the form of a salt such as hydrochloride. Typical examples of such aromatic diaminodithiol compounds or their salts are:

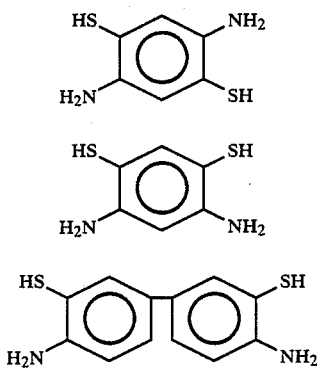

or their salts such as hydrochlorides.

The dicarboxylic acid derivatives used in the present invention include those having carboxylic groups substituted as follows:

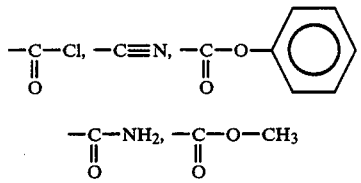

The residual groups of the above dicarboxylic acid derivatives are preferably aromatic groups. A preferred example of such dicarboxylic acids is terephthalic acid.

In order to carry out the interfacial polymerization of the aromatic diaminodithiol compounds or their salts and the dicarboxylic acid derivatives, they are dissolved in solvents which are incompatible to each other. The solvents for the aromatic diaminodithiol compounds or their salts are preferably water, while the solvents for the dicarboxylic acid derivatives may be organic solvents such as halogenated solvents such as chloroform and carbon tetrachloride, cyclohexanone, methyl ethyl ketone, etc.

In a case where a salt of the aromatic diaminodithiol compound is used, it may be dissolved in an alkali aqueous solution to remove counter ions of the salt, thereby increasing its reactivity. The alkalis used in the aqueous solution include sodium hydrogen carbonate, potassium hydrogen carbonate, sodium hydroxide, etc. The alkalis have a function to neutralize by-products such as HCl generated in the interfacial polymerization reaction, thereby increasing the reaction rate.

To cause the interfacial polymerization reaction, an aqueous solution of the aromatic diaminodithiol compound or its salt and a solution of the dicarboxylic acid derivative in an organic solvent are combined. Since both solvents are not soluble in one another, they remain in two phases without forming a uniform solution. In the boundary in which these two phases are in contact with each other (interface), the aromatic diaminodithiol compound or its salt and the dicarboxylic acid derivative are caused to react with each other.

In the interfacial polymerization method, since the aromatic diaminodithiol compound or its salt and the dicarboxylic acid derivative exist substantially in equimolar proportions in both solutions along the interface, an equimolar polymerization reaction proceeds to provide the resulting polymer with a large polymerization degree. On the other hand, when the polymerization is carried out in a uniform solution, the probability of contact between both compound molecules, namely the proportions of both compound molecules participating in the reaction vary locally, it is difficult to proceed the equimolar polymerization reaction sufficiently, making it highly likely that the polymerization reaction terminates before completion. Accordingly, the prepolymer of aromatic polythiazole having a large polymerization degree can hardly be obtained.

In the present invention, to increase the reaction rate of the interfacial polymerization, it is preferable to conduct stirring in the process of combining the two solutions. However, excess stirring leads to too small dispersion particles, making it unable to achieve equimolar conditions in the interface. In this case, the formed prepolymer of aromatic polythiazole has a reduced polymerization degree. The degree of stirring may also vary depending upon other reaction conditions, but to produce the prepolymer of aromatic polythiazole having a high polymerization degree stably, the stirring is preferably such that it provides dispersion particles having a particle size of about 0.01–1 mm or more in the reaction mixture.

The interfacial polymerization reaction is conducted at a relatively low temperature to prevent the ring closure reaction of the prepolymer to polythiazole. The reaction temperature is preferably within the range of $-40°$ C. to $+40°$ C. Such a relatively low reaction temperature condition can be achieved by using a dicarboxylic acid derivative instead of dicarboxylic acid itself, and by carrying out the interfacial polymerization. By this reaction, the aromatic diaminodithiol compound or its salt and the dicarboxylic acid derivative form the prepolymer of aromatic polythiazole having a repeating unit represented by the following general formula:

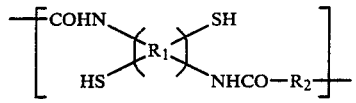

wherein $R_1$ is an aromatic group, and $R_2$ is a dicarboxylic acid residual group.

In the above formula, the positions of the substituents are not restricted to those depicted in the formula, and they may be interchanged.

By conducting the polymerization reaction under the above conditions, the prepolymer of aromatic polythiazole having a large polymerization degree can be obtained without causing a ring closure reaction. The polymerization degree of the prepolymer is generally about 5–20 or so.

The prepolymer of aromatic polythiazole thus obtained may be washed and dried by a known method.

The polythiazole prepolymer produced according to the method of the present invention provides polythiazole, which is a rigid, high-strength aromatic polymer, by the ring closure reaction by a heat treatment as exemplified below.

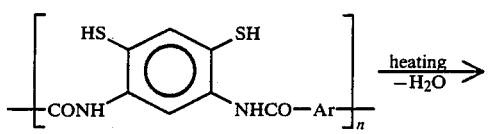
(a)

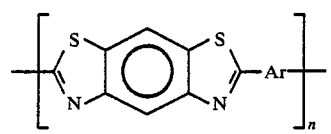

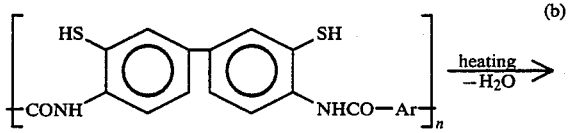
(b)

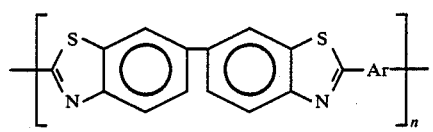

According to the present invention, since the aromatic diaminodithiol compound or its salt and the dicarboxylic acid derivative are subjected to an interfacial polymerization reaction at a relatively low temperature, substantially equimolar reaction condition can be kept, thereby providing the prepolymer of aromatic polythiazole having a large polymerization degree without causing a ring closure reaction.

The present invention will be explained in further detail by the following Examples.

EXAMPLE 1

0.5 g of pulverized 2,5-diamino-1,4-bezenedithiol dihydrochloride was dissolved in a sodium hydroxide aqueous solution prepared by dissolving 0.163 g of sodium hydroxide in 50 cc of distilled water, and 30 cc of chloroform was added thereto. Separately, 0.414 g of terephthalic acid dichloride was dissolved in 70 cc of chloroform in a dropping funnel. The terephthalic acid dichloride solution was dropped quickly into the above alkali solution of 2,5-diamino-1,4-bezene dithiol dihydrochloride while vigorously stirring at room temperature, and their interfacial polymerization was conducted for 1 hour while stirring. The resulting product was poured into 500 cc of distilled water, stirred, washed and then subjected to vacuum filtration. After that, it was washed with diluted hydrochloric acid and distilled water, and finally dried at 60° C. in vacuum.

The resulting product was analyzed by infrared spectrum. The results are shown in FIG. 1. It was confirmed from FIG. 1 that the product was a polybenzothiazole prepolymer having a repeating unit having the following structure:

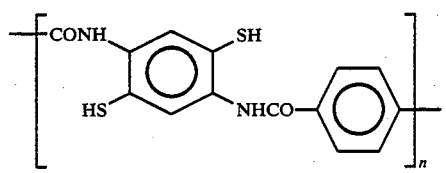

Incidentally, the infrared spectrum analysis was conducted by a KBr method using "20DXB" (manufactured by Nicole K.K.).

To evaluate its polymerization degree, its inherent viscosity $\eta_{inh}$ was measured in concentrated sulfuric acid (0.1 g/dl concentration, 30° C.). As a result, its $\eta_{inh}$ was 0.27.

EXAMPLE 2

An interfacial polymerization reaction was conducted in the same manner as in Example 1 except for substituting 0.4 g of sodium hydrogen carbonate for 0.163 g of sodium hydroxide, and substituting cyclohexanone for chloroform.

As a result of infrared spectrum analysis, it was confirmed that the resulting product was a polybenzothiazole prepolymer having a repeating unit as shown in Example 1. Its $\eta_{inh}$ was 0.30.

EXAMPLE 3

An interfacial polymerization was conducted in the same manner as in Example 2 except for substituting methyl ethyl ketone for cyclohexanone.

As a result of infrared spectrum analysis, it was confirmed that the resulting product had the same structure as in Example 1. And its $\eta_{inh}$ was 0.35.

The present invention has been explained by the above Examples, but the present invention is not restricted thereto, and polythiazole prepolymers can be produced similarly by using multi-ring aromatic diaminodithiol compounds such as those having biphenyl groups.

As described above in detail, by the method of producing the prepolymer of aromatic polythiazole according to the present invention, the reaction products can be produced stably at the stage of prepolymers without being converted to insoluble ring-closed polymers. Also, since both components are subjected to an equimolar polymerization reaction in the interface of the two incompatible solutions, prepolymers having a large polymerization degree can be stably obtained. Further, since the interfacial polymerization is conducted at a relatively low temperature, the ring closure reaction of the prepolymer can be surely prevented.

The prepolymers of aromatic polythiazole obtained by the method of the present invention may be uniformly mixed with matrix polymers or their prepolymers in organic solvents, and subjected to a ring closure reaction by heating to provide molecular composite materials. The resulting molecular composite materials have good mechanical properties, heat resistance, solvent resistance, etc. Because of such good properties, they can be used as high-strength, heat-resistant engineering plastic materials for automobile parts, aircraft parts, etc.

What is claimed is:

1. A method of producing a prepolymer of aromatic polythiazole from an aromatic diaminodithiol compound or a salt thereof and a dicarboxylic acid derivative, said prepolymer having a repeating unit represented by the following general formula:

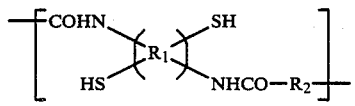

wherein $R_1$ is an aromatic group having at least one benzene nucleus, and $R_2$ is a residual group of said dicarboxylic acid derivative,
comprising the step of polymerizing said aromatic diaminodithiol compound or a salt thereof and said dicarboxylic acid derivative by an interfacial polymerization method.

2. The method according to claim 1, wherein said interfacial polymerization is carried out under the temperature condition of $-40°$ C. to $+40°$ C.

* * * * *